United States Patent [19]
Levitan et al.

[11] Patent Number: 5,796,998
[45] Date of Patent: Aug. 18, 1998

[54] APPARATUS AND METHOD FOR PERFORMING BRANCH TARGET ADDRESS CALCULATION AND BRANCH PREDICITON IN PARALLEL IN AN INFORMATION HANDLING SYSTEM

[75] Inventors: David Stephen Levitan; John S. Muhich, both of Austin, Tex.; Adam R. Talcott, Santa Clara, Calif.; Steven W. White, Austin, Tex.

[73] Assignee: International Business Machines Corporation, Armonk, N.Y.

[21] Appl. No.: 754,377

[22] Filed: Nov. 21, 1996

[51] Int. Cl.$^6$ ................................................. G06F 9/32
[52] U.S. Cl. ............................................ 395/586; 395/382
[58] Field of Search ................................ 395/381, 382, 395/383, 582, 583, 584, 586, 587

[56] References Cited

U.S. PATENT DOCUMENTS

| | | | |
|---|---|---|---|
| 4,200,927 | 4/1980 | Hughes et al. | 395/383 |
| 4,775,927 | 10/1988 | Hester et al. | 395/383 |
| 5,283,873 | 2/1994 | Steely, Jr. et al. | 395/587 |
| 5,371,864 | 12/1994 | Chuang | 395/382 |
| 5,434,985 | 7/1995 | Emma et al. | 395/587 |
| 5,634,025 | 5/1997 | Breternitz, Jr. | 395/383 |

OTHER PUBLICATIONS

"Improving the Accuracy of Dynamic Branch Prediction Usiing Branch Correlation," *Association of Computing Machnery ASPLOS V*, pp. 76–84, Oct. 1992.

*Primary Examiner*—Richard L. Ellis
*Attorney, Agent, or Firm*—Winstead Sechrest & Minick P.C.; Anthony V. S. England

[57] ABSTRACT

An apparatus and method for fetching instructions in an information handling system operating at a predetermined number of cycles per second includes an instruction cache for storing instructions to be fetched. Branch target calculators are operably coupled to instruction queues and to a fetch address selector for determining, in parallel, if instructions in the instruction queues are branch instructions and for providing, in parallel, a target address for each of the instruction queues to the fetch address selector such that the fetch address selector can provide the instruction cache with one of the plurality of target addresses as the next fetch address. Decoding of instructions, calculating the target addresses of branch instructions, and resolving branch instructions are performed in parallel instead of sequentially and, in this manner, back-to-back taken branches can be executed at a rate of one per cycle.

22 Claims, 7 Drawing Sheets

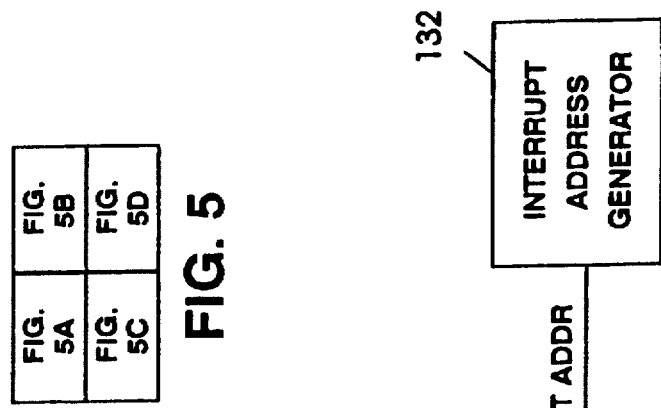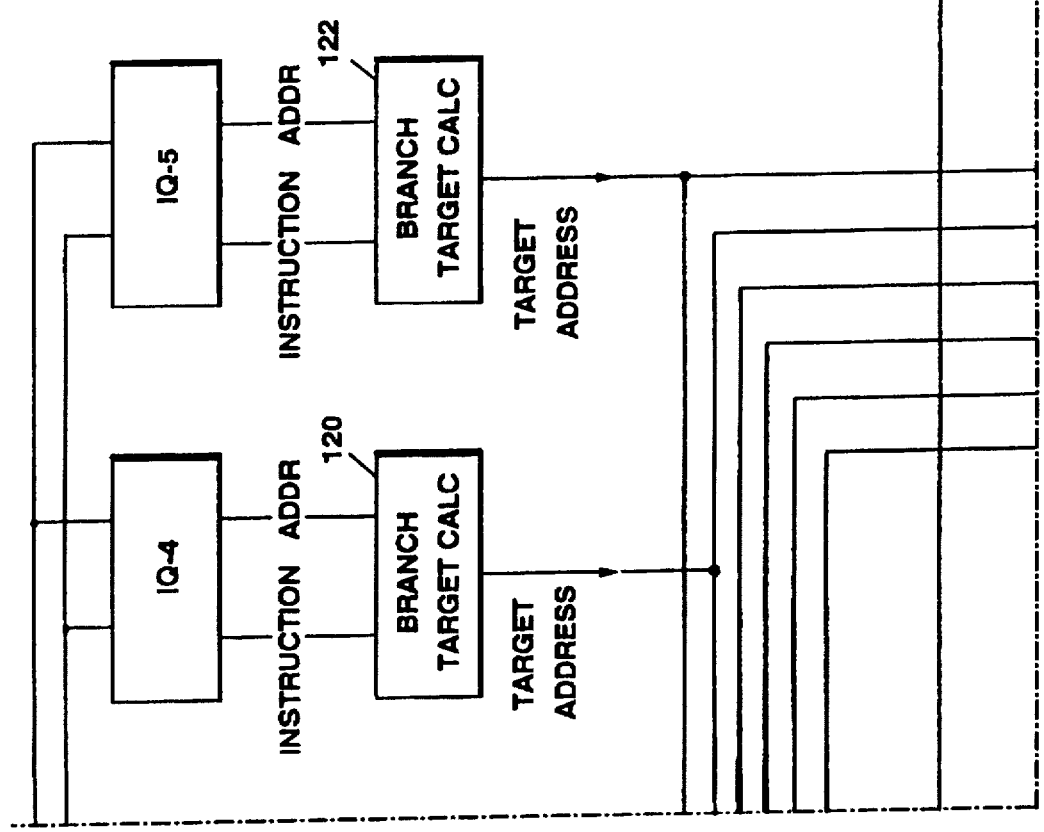

APPARATUS AND METHOD FOR PERFORMING BRANCH TARGET ADDRESS CALCULATION AND BRANCH PREDICITON IN PARALLEL IN AN INFORMATION HANDLING SYSTEM

CROSS REFERENCE TO RELATED APPLICATIONS

This application for patent is related to the following application for patent filed concurrently herewith: APPARATUS AND METHOD FOR INSTRUCTION FETCHING USING A MULTI-PORT INSTRUCTION CACHE DIRECTORY, Ser. No. 08/741,465, filed Oct. 31, 1996.

TECHNICAL FIELD OF THE INVENTION

The present invention relates to information handling systems and methods for operating information handling systems, and more particularly, to instruction fetch units within an information handling system and methods for fetching instructions in an information handling system.

BACKGROUND OF THE INVENTION

The presence of branch instructions in the instruction stream has long been an obstacle to achieving high performance in a processor or central processing unit (CPU) of an information handling system. Branch instructions select between a first sequential path of instructions and a second branch path of instructions as the subsequent instructions to be processed by the processor. Branch instructions alter the instruction stream's inherent, straight-line flow of control, and typically cause the CPU to stall while those instructions along the branch path are fetched from a cache or from memory.

Branch instructions introduce additional processing delay by the CPU. First, some delay occurs between the time a branch instruction is loaded into an instruction queue (IQ) after being fetched from an instruction cache (IC) and the time when it is decoded and found to be a branch. Second, if an instruction is found to be a conditional branch, there is often additional delay required for the condition on which the branch is based to be computed. After the condition on which the branch is based is computed, the branch is said to be resolved. Finally, after a branch has been resolved, if it is taken, the IC must be accessed and instructions in the IQ purged and replaced with those instructions which logically follow the branch instruction.

Existing Solutions

There are a number of existing solutions for reducing the additional processing delay caused by branch instructions, each of which provides a varying degree of effectiveness. The simplest solution is to do nothing about the additional processing delay and incur the maximum penalty or amount of time to process a branch instruction. This approach is depicted in the cycle time line of FIG. 1. In this approach, a branch instruction is fetched from the IC and stored in the IQ during one or more processing clock cycles of the CPU. Once a branch is in the IQ, it takes some time for the CPU to identify the instruction as a branch and execute it. It may take a cycle for the branch to execute. Executing a branch instruction involves three steps. First, the branch instruction or any other instruction, branch or otherwise, is decoded by the CPU to determine whether the instruction is a branch instruction. Second, if the instruction is a branch instruction, then the outcome of the branch instruction is resolved or predicted. Determining the outcome of the branch instruction means determining whether a branch instruction is "taken." A branch instruction is said to be "taken" when the second branch path of instructions is selected, thereby altering, or jumping from the first sequential or straight-line path of instructions. If a branch instruction is "not taken," then the instruction stream continues along the first sequential path of instructions. If a branch instruction cannot be resolved, i.e., the outcome cannot be determined, due to an unfulfilled condition, then the outcome of the branch instruction must be predicted. Finally, the target address of the branch instruction, i.e., the address of the instruction to which the branch instruction branches or jumps to (the branch instruction's logical successor), is calculated. The target address is the address of the first instruction in the second branch path of instructions. After branch instruction execution, the branch instruction's logical successor may be fetched and placed in the IQ in the subsequent cycle. If it is determined that the branch has been mispredicted, there are often additional penalty cycles before instructions along the correct path can be fetched and placed in the IQ. Because of its large branch instruction penalty, this scheme is not used in any of today's high-performance processors.

To avoid waiting a cycle for the IQ to be filled after a mispredicted branch outcome, both of a branch's possible paths may be fetched simultaneously as depicted in FIG. 2. Once a branch is detected in the IQ, the branch's predicted outcome is determined and instructions along the expected branch path are placed in the IQ while those instructions along the alternate path are placed in an alternate path buffer. If the branch is predicted correctly, then the behavior of this scheme is similar to that of the scheme depicted in FIG. 2. However, if the branch is mispredicted, then fetching both branch paths in parallel allows the IQ to be filled soon after the misprediction is detected by taking the instructions from the alternate path buffer. The main problem with this approach is that it requires an instruction cache port for each branch path, which also limits the number of branches which may be executed in a cycle. Furthermore, fetching alternate branch paths increases design complexity because several alternate path buffers are required to store the large number of alternate paths resulting from multiple outstanding predicted conditional branches. Additional complexity results from the need to load the IQ from any one of these alternate path buffers.

Another approach makes use of a Branch Target Address Cache (BTAC). The cycle time line of this approach is depicted in FIG. 3. The BTAC, which is accessed in parallel with the instruction cache, provides a guess of the address of the instruction to be fetched during the subsequent cycle. Only entries for branches which are known to be taken or predicted to be taken during their next execution are stored in the BTAC. A set of tags in the BTAC determines whether or not a given fetch address is contained in the BTAC. If a BTAC access is a miss, it is assumed that the current set of instructions being fetched from the instruction cache contains either no branches at all, or one or more not-taken branch instructions. If the BTAC access hits, the resulting address is used as the instruction fetch address during the subsequent cycle. This technique avoids a delay between the time a taken branch instruction is loaded into the IQ and the time at which the instruction path is altered. If the subsequent fetch address is mispredicted, it will take one or more additional cycles for the correct instructions to be fetched from the instruction cache. BTAC-based designs suffer from increased design complexity, an increased demand for space for the BTAC array, performance penalties when the BTAC mispredicts outcomes, and difficulty with the BTAC update policy.

In each of the three approaches discussed above, the three steps in the executing of a branch instruction are performed sequentially or in series. That is, first, the instruction is decoded to determine whether the instruction is a branch instruction, and after this is determined, the branch instruction is predicted if unresolved. After the branch instruction is resolved or predicted, the target address of the branch instruction can be calculated so that the branch instruction's logical successor can be calculated. What is needed is an approach which performs the decoding, predicting, resolving, and target address calculating in parallel or during the same time so that a plurality of addresses or branch logical successors are provided in parallel to the instruction cache.

SUMMARY OF THE INVENTION

Accordingly, an instruction fetch unit for an information handling system includes a cache for storing addressable instructions; instruction queues operably coupled to the cache for storing a set of fetched instructions; a fetch address selector operably coupled to the cache for selecting a fetch address and for providing the fetch address to the cache to fetch a new set of instructions; and a branch target calculator operably coupled to the instruction queues and to the fetch address selector for determining, in parallel, if instructions in the instruction queues are branch instructions and for providing, in parallel, target addresses of the branch instructions to the fetch address selector, such that the fetch address selector can provide the cache with one of a plurality of target addresses as the fetch address.

The present invention also provides a method for fetching instructions in an information handling system including a cache for storing addressable instructions, instruction queues for storing a set of fetched instructions, and a branch target calculator coupled to the instruction queues and a fetch address selector. The method comprises the steps of determining in parallel, in a branch target calculator, if the instructions in the instruction queues are branch instructions; calculating in parallel, in the branch target calculators, the target addresses of the branch instructions; selecting, in the fetch address selector, one of the target addresses as a fetch address; and providing the cache with the fetch address for fetching a new set of instructions.

The present invention provides the advantage of performing instruction decoding, resolution, prediction and branch target address calculating, in parallel, to achieve higher performance than prior art instruction fetching units by reducing the processing time incurred as a result of a mispredicted branch instruction.

The present invention provides the advantage of allowing multiple branch predictions to be performed, in parallel, to allow more useful computation to be done in a single cycle compared to the prior art.

The present invention also provides the advantage of eliminating the need for alternative path buffers or branch target address caches.

BRIEF DESCRIPTION OF THE DRAWINGS

FIGS. 5, 5a, 5b, 5c, and 5d illustrates an instruction fetch unit according to the present invention;

DETAILED DESCRIPTION OF A PREFERRED EMBODIMENT OF THE INVENTION

Figure 4:
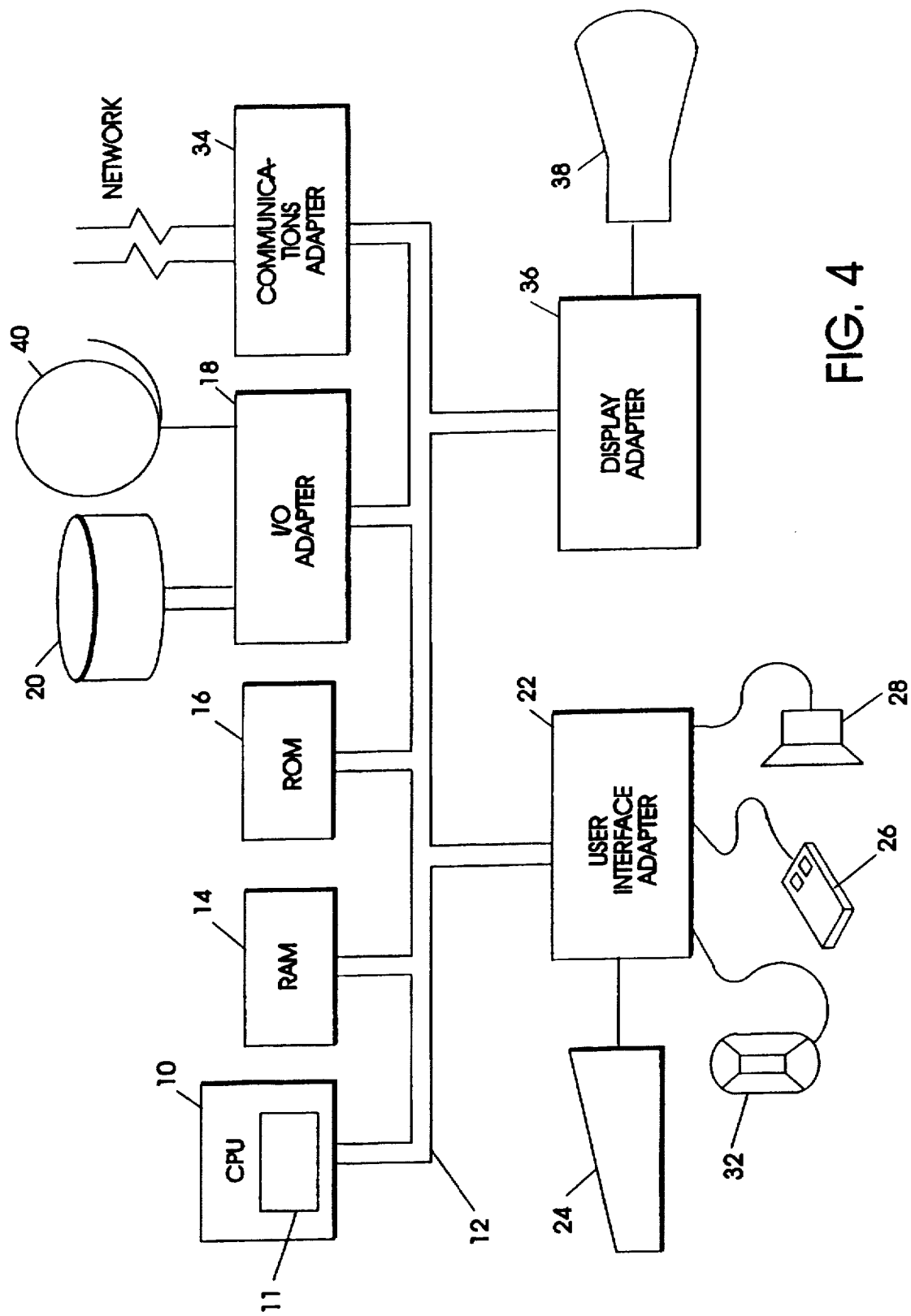
FIG. 4 is an information handling system embodying the present invention.

A representative hardware environment for practicing the present invention is depicted in FIG. 4 which illustrates a typical hardware configuration of an information handling system in accordance with the subject invention having at least one central processing unit (CPU) 10 with an integrated instruction fetch unit 11 and a number of other units such as one or more execution units (not shown) or a memory management unit (not shown). CPU 10 is interconnected via system bus 12 to random access memory (RAM) 14, read only memory (ROM) 16, and input/output (I/O) adapter 18 for connecting peripheral devices such as disc units 20 and tape drives 40 to bus 12, user interface adapter 22 for connecting keyboard 24, mouse 26, speaker 28, microphone 32, and/or other user interfaced devices such as a touch screen device (not shown) to bus 12, communication adapter 34 for connecting the information handling system to a data processing network, and display adapter 36 for connecting bus 12 to display device 38.

Figure 5A:
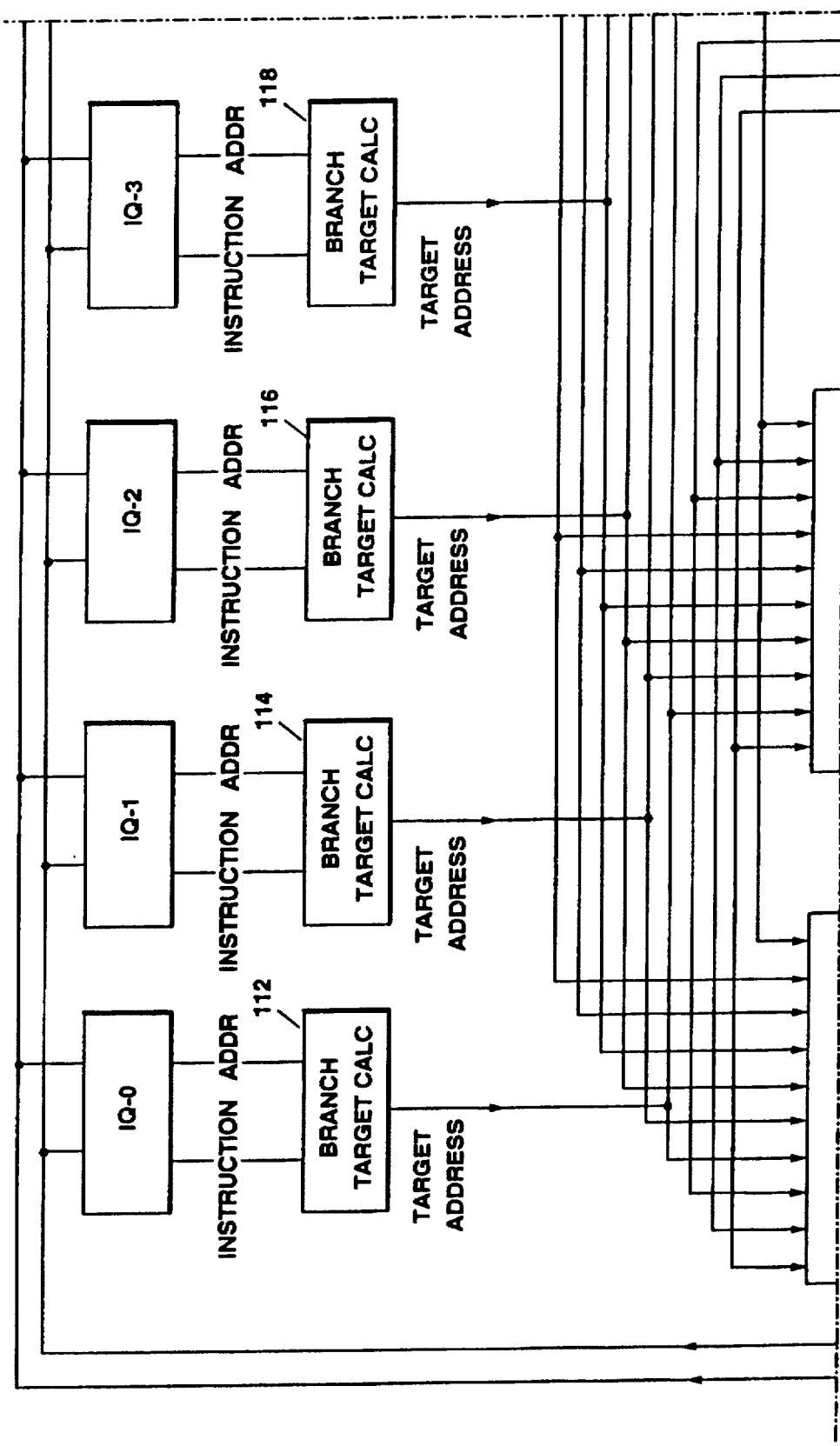
Figure 5C:
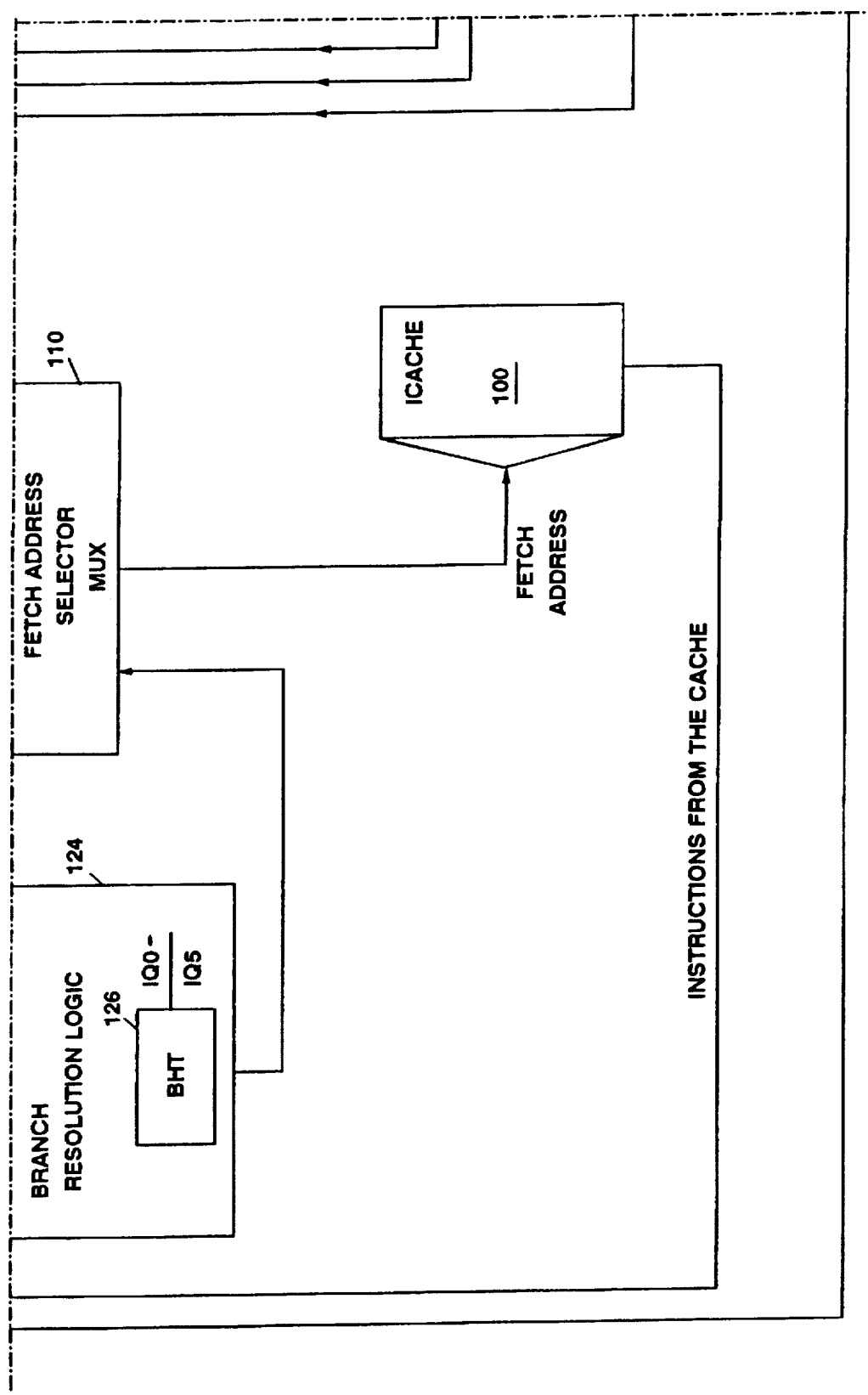
Figure 5D:
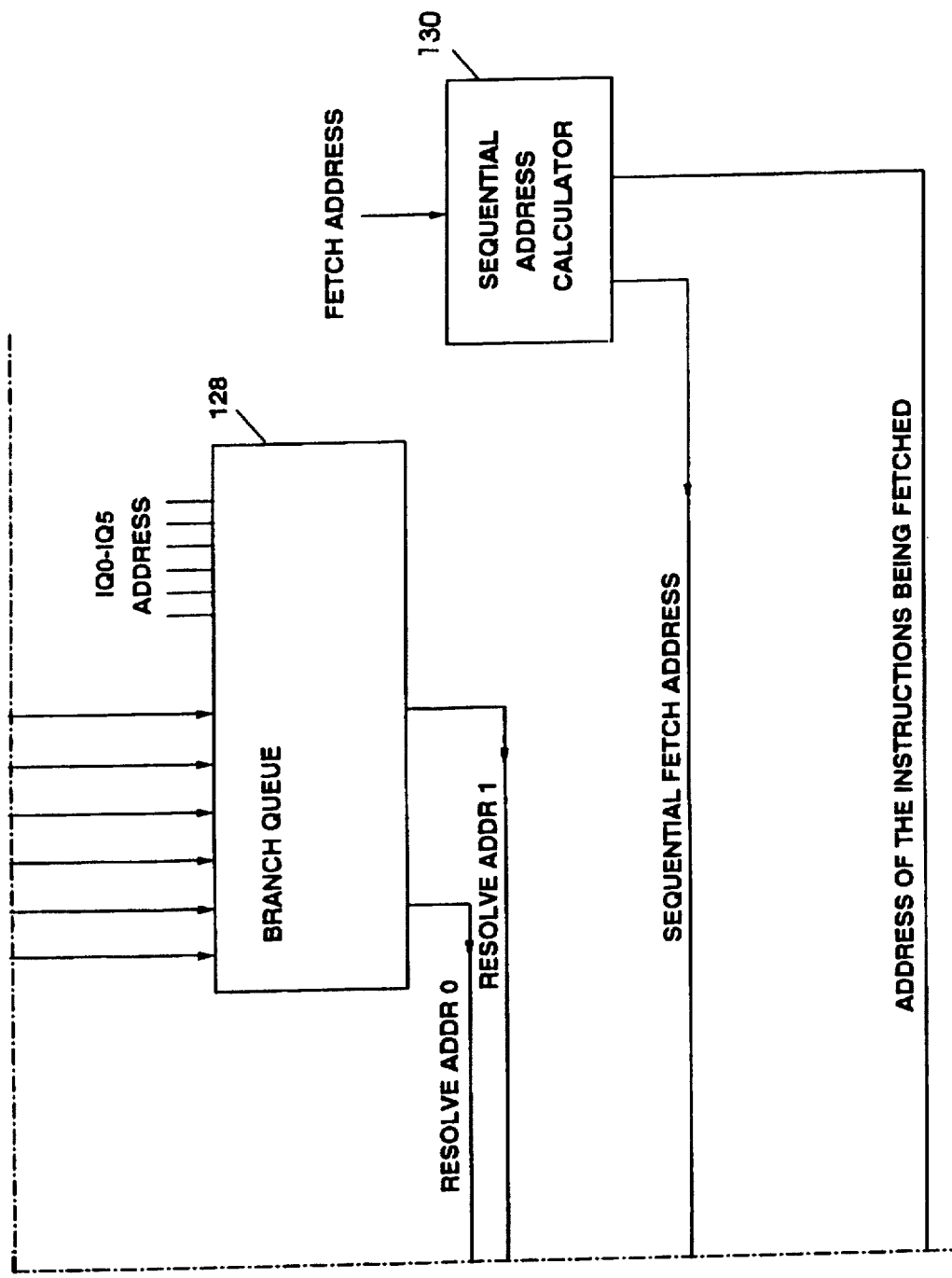

Referring now to FIG. 5, the instruction fetch unit 11 and the method for fetching instructions according to the present invention will be described.

Instruction fetch unit 11 includes instruction cache 100 for storing instructions to be fetched. The instructions to be fetched are located at addressable memory locations. Thus, the instructions are said to be addressable. Instruction fetch unit 11 access instruction cache 100 in an attempt to obtain the instructions in a cache line of memory located at a fetch address. A particular set of instructions, identified by a fetch address, may be located in instruction cache 100 or in one of the next memory hierarchical levels such as in RAM 14. A plurality of instruction queues IQ-0, IQ-1, IQ-2, IQ-3, IQ-4, and IQ-5, are operably coupled to instruction cache 100 for storing a set of instructions fetched from the instruction cache 100 or from other hierarchical levels of memory. It will be appreciated that instruction queues IQ-0 through IQ-5 could be combined to form a common queue segmented to form a plurality of queues according to the present invention. A fetch address selector 110 is operably coupled to instruction cache 100 for selecting the fetch address and for providing the fetch address to instruction cache 100 to fetch a new set of instructions from instruction cache 100. Branch target calculators 112, 114, 116, 118, 120, and 122 are coupled to instruction queues IQ-0, IQ-1, IQ-2, IQ-3, IQ-4, and IQ-5, respectively, such that each instruction queue is associated with a branch target calculator. Branch target calculators 112-122 determine, in parallel, if instructions in the instruction queues IQ-0 through IQ-5 are branch instructions and provide, in parallel, a target address to fetch address selector 110 such that fetch address selector 110 can provide instruction cache 100 with one of a plurality of target addresses as the fetch address. In this manner, the target addresses of the branch instructions are available at the same time if one or more of the branch instructions are taken. Thus, instruction fetch unit 11 can process back-to-back branch instructions at a sustainable rate of one per cycle.

Instruction fetch unit 11 further includes branch resolution logic 124 operably coupled to fetch address selector 110 for resolving the branch instructions. Branch resolution logic 124 includes a branch history table for storing BHT entries for predicting the outcomes of the branch instructions. Branch history table 126 is operably coupled to instruction queues IQ-0 through IQ-5 for providing instruction queues IQ-0 through IQ-5 with the BHT entries corresponding to each instruction at the same time that the set of instructions fetched from instruction cache 100 or other memory levels are stored in instruction queues IQ-0 through IQ-5. In other words, each time a newly fetched instruction is stored in one of the instruction queues, a BHT entry corresponding to the instruction is stored with the instruction in the instruction queue. Branch resolution logic 124 utilizes the branch prediction data contained within the BHT entries stored in instruction queues IQ-0 through IQ-5 to predict any unresolved branch instructions in the queues and resolve these branches according to the predictions. In this manner, multiple branch predictions are performed. Branch target calculators 112–122 determine if an instruction in each respective instruction queue IQ-0 through IQ-5 is a branch instruction and provides a target address before or during the time in which the branch resolution logic 124 resolves the branch instructions such that the branch resolution logic 124 resolves a plurality of branch instructions in parallel. Instruction fetch unit 11 further includes a branch queue 128 operably coupled to each branch target calculator 112–122 for receiving the target addresses. Branch queue 128 is also operably coupled to each of the instruction queues IQ-0 through IQ-5 for receiving the addresses of the set of instructions stored in instruction queues IQ-O through IQ-5. Branch queue 128 saves, for each predicted branch outcome, either one of the target addresses from branch target calculators 112–122 if the predicted branch outcome is not taken or one of the instruction addresses stored in IQ-0 through IQ-5 if the predicted branch outcome is taken. In the case of a mispredicted branch outcome, the addresses saved in branch queue 128 are provided to fetch address selector 1:LO as resolve addresses, resolve addr0 and resolve addr1. Branch queue 128 is also operably coupled to fetch address selector 110 for providing the fetch address selector 110 with at least one resolved address. In the preferred embodiment, branch queue 128 provides such address selector 110 with two resolved addresses, resolve addr0 and resolve addr1.

Instruction fetch unit 11 further includes a sequential address calculator 130 which has as an input the fetch address and as outputs the next sequential fetch address and the addresses of the instructions being fetched. The sequential fetch address is provided to fetch address selector 110, whereas the addresses of the instructions being fetched are provided to instruction queues IQ-0 through IQ-5. It is to be noted that instruction queues IQ-0 through IQ-5 store both instructions and the addresses for the instructions.

Instruction fetch unit 11 further includes an interrupt address generator 132 for providing an interrupt address to fetch address selector 110. Branch resolution logic 124 inputs all of the target addresses from branch target calculators 112–122, the interrupt address, the sequential fetch address, and the two resolved addresses from branch queue 128, resolve addr0 and resolve addr1. Branch resolution logic 124 prioritizes the target addresses, resolve addr0, resolve addr1, the sequential address, and the interrupt address from a highest priority address to a lowest priority address such that fetch address selector 110 selects the highest priority address as the fetch address. Typically, the highest priority is granted to the address corresponding to the oldest interrupt or mispredicted branch, i.e., an interrupt address or a resolve address, the target address of branch instructions in the IQs are granted the next highest priority and are prioritized further from oldest to youngest, and the sequential address is granted the lowest priority. It will be appreciated that other priority schemes may be utilized within the scope of the present invention. Fetch address selector 110 functions as a multiplexor to select the fetch address from one of the target addresses, the interrupt address, the sequential fetch address, or the resolved address based upon the priority information received from branch resolution logic 124.

The present invention also includes a method for fetching instructions in an information handling system including an instruction cache 100 for storing instructions to be fetched, a plurality of instruction queues IQ-0 through IQ-5 for storing a set of instructions fetched from instruction cache 100, a branch target calculator 112–122 coupled to each instruction queue IQ-0 through IQ-5, and a fetch address selector 110. The method comprises the steps of determining, in parallel, in each branch target calculator 112–122, if the instructions in the instruction queues IQ-0 through IQ-5 are branch instructions; calculating in parallel in the branch target calculators 112–122, the target addresses of the branch instructions; selecting, in the fetch address selector, one of the target addresses as a fetch address; and providing the instruction cache 100 with the fetch address for fetching a new set of instructions from the instruction cache 100. The method further includes the steps of providing branch resolution logic 124 operably coupled to fetch address selector 110 and resolving in the branch resolution logic 124 the branch instructions. The determining and calculating steps are performed either before or during the time in which the resolving step is performed. The resolving step further includes the step of predicting the outcomes of the branch instructions, predicting the outcomes of the branch instructions is accomplished by providing a branch history table 126 including BHT entries. The method of the present invention further includes storing the BHT entries in instruction queues IQ-0 through IQ-5 at the same time that the set of instructions fetched from the instruction cache 100 are stored in the instruction queues IQ-0 through IQ-5. The method further includes the step of providing a branch queue 128 coupled to each branch target calculator 112–122, each instruction queue IQ-0 through IQ-5, and the fetch address selector 110, and the step of receiving in the branch queue 128 the target addresses and the instruction addresses of the set of instructions stored in the instruction queues IQ-0 through IQ-5. The method of the present invention further includes the step of saving, in branch queue 128, for each predicted branch outcome, either one of the target addresses from branch target calculators 112–122 if the predicted branch outcome is not taken or one of the instruction addresses stored in IQ-0 through IQ-5 if the predicted branch outcome is taken. The method of the present invention further includes the step of resolving, in branch resolution logic 124, predicted branch outcomes and, in the case of a mispredicted branch outcome, providing the addresses saved in branch queue 128 as resolve addresses, resolve addr0 and resolve addr1, to fetch address selector 110. The method of the present invention further includes the steps of providing an interrupt address, from interrupt address generator 132, and a sequential fetch address, from sequential address calculator 130, to the fetch address selector 110. The sequential fetch address is the address of the next sequential instruction after the instructions stored in IQ-0 through IQ-5. The method further comprises the step of prioritizing in the branch resolution logic 124 the target addresses, each resolved address, the sequential address, and the interrupt address from a highest priority address to a lowest priority address, and wherein the selecting step further includes the step of selecting the highest priority address as the fetch address.

Figure 1:
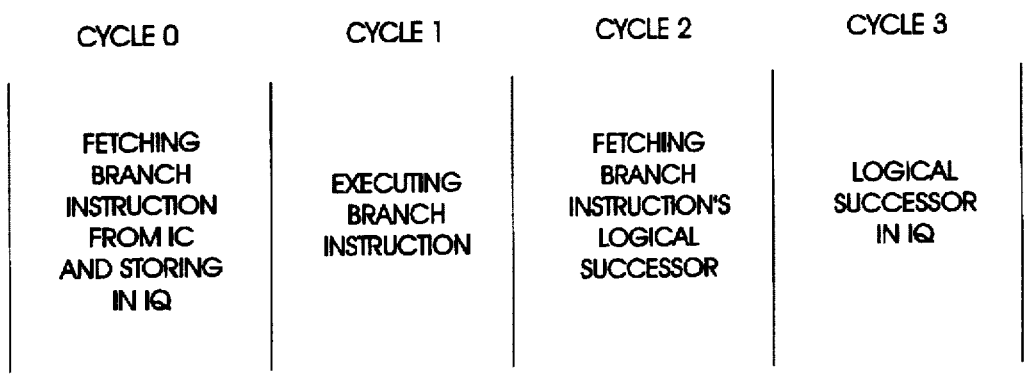
FIG. 1 is a cycle time line illustrating a prior art approach to fetching instructions in an information handling system.
Figure 2:
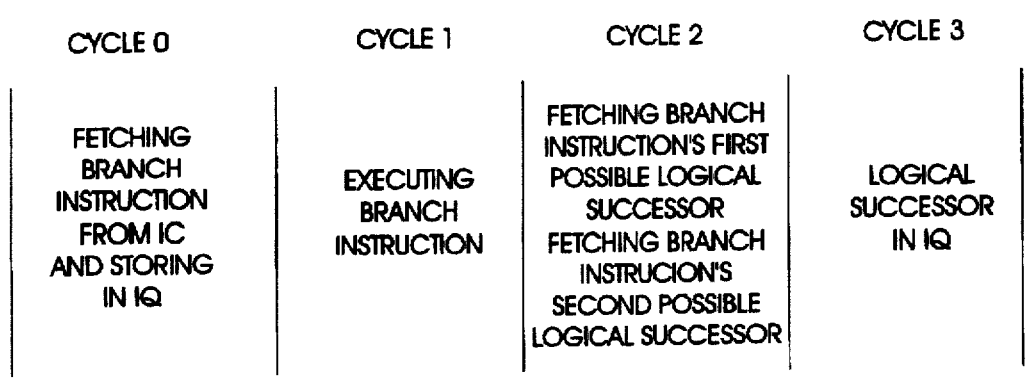
FIG. 2 is a cycle time line illustrating another prior art approach to fetching instructions in an information handling system.
Figure 3:
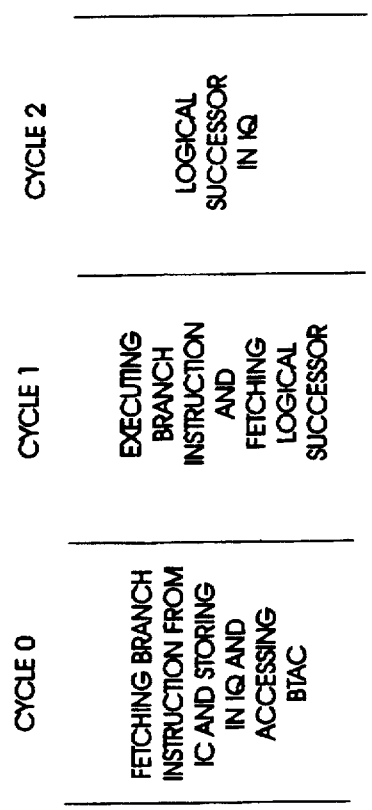
FIG. 3 is a cycle time line illustrating yet another prior art approach to fetching instructions in an information handling system.
Figure 6:
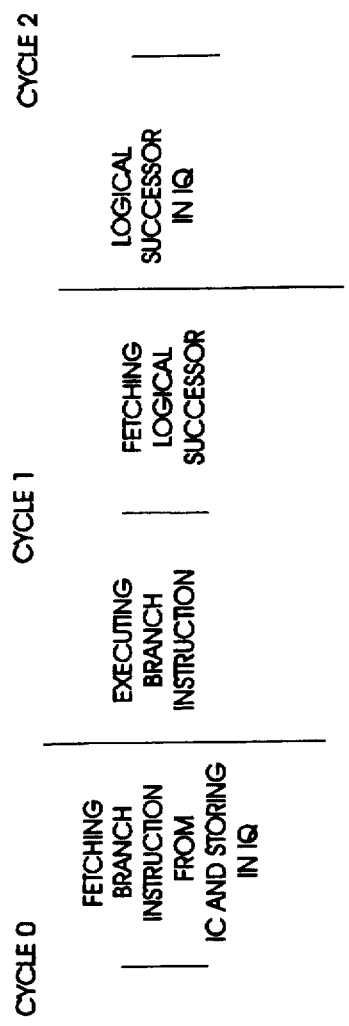
FIG. 6 is a cycle time line illustrating instruction fetching according to the present invention.

Referring now to the cycle time line in FIG. 6, a method according to the invention for fetching a new instruction in an information handling system operating at a predetermined number of processing cycles per second is illustrated. The method comprises the steps of dividing each cycle into a first half and a second half, executing a current instruction wherein the step of executing includes the steps of decoding the current instruction to determine if the current instruction is a branch instruction; and if the current instruction is a branch instruction, calculating the target address of the branch instruction and resolving the branch instruction. The method further includes fetching, using one of the target addresses, the new instruction path or stream in the second half of the cycle. Thus, the calculation of the target addresses, the selection of a fetch address, and fetching of a new instruction are performed during a single processing cycle of the system. The decoding of instructions, calculating the target addresses of branch instructions, and resolving branch instructions are performed in parallel instead of sequentially and, in this manner, may be performed during the first half of the cycle instead of requiring a complete cycle. In this manner, fetching a new instruction can be performed within a cycle, and back-to-back taken branches can be executed at a sustainable rate of one per cycle without the hardware associated with a BTAC or alternate path buffers.

Although the present invention and its advantages have been described in detail, it should be understood that various changes, substitutions and alterations can be made herein without departing from the spirit or scope of the invention as defined in the appended claims.

What is claimed is:

1. In an information handling system, an apparatus for fetching instructions comprising;
   cache for storing addressable instructions;
   instruction queues operably coupled to said cache for storing a set of fetched instructions;
   fetch address selector operably coupled to said cache for selecting a fetch address and for providing said fetch address to said cache to fetch a new set of instructions;
   at least one branch target calculator operably coupled to said instruction queues and to said fetch address selector for determining, in parallel, if instructions in said instruction queues are branch instructions and for providing, in parallel, target addresses of the branch instructions to said fetch address selector such that said fetch address selector can provide said cache with one of a plurality of target addresses as said fetch address.
   branch resolution logic operably coupled to said fetch address selector for resolving or predicting said branch instructions, and
   a branch queue operably coupled to said branch target calculators for receiving said target addresses operably coupled to said instruction queues for receiving the addresses of said set of fetched instructions stored in said in instruction queues and operably coupled to said fetched address selector for providing said fetch address selector with at least one resolved address.

2. The apparatus, as recited in claim 1, wherein said branch target calculator determines if an instruction in said instruction queue is a branch instruction and provides a target address before or during the time in which said branch resolution logic resolves said branch instructions such that said branch resolution logic resolves a plurality of said branch instructions in parallel.

3. The apparatus, as recited in claim 1, wherein said branch resolution logic includes prediction means for predicting the outcomes of said branch instructions.

4. The apparatus, as recited in claim 3, wherein said prediction means includes a branch history table including BHT entries.

5. The apparatus, as recited in claim 4, wherein said branch history table is operably coupled to said instruction queues for providing said instruction queues with said BHT entries at the same time that said set of fetched instructions are stored in said instruction queues.

6. The apparatus, as recited in claim 1, further comprising a sequential address calculator for providing a sequential address to said fetch address selector.

7. The apparatus, as recited in claim 6, wherein said instruction queues store an address for said instruction stored in said instruction queue.

8. The apparatus, as recited in claim 7, wherein said sequential address calculator is operably coupled to said instruction queues for providing the addresses of said instructions stored in said instruction queues.

9. The apparatus, as recited in claim 6, further comprising an interrupt address generator for providing an interrupt address to said fetch address selector.

10. The apparatus, as recited in claim 9, wherein said branch resolution logic includes means for prioritizing said target addresses, said resolved address, said sequential address, and said interrupt address provided to said fetch address selector from a highest priority address to a lowest priority address such that said fetch address selector selects said highest priority address as said fetch address.

11. The apparatus, as recited in claim 1, wherein said fetch address selector comprises a multiplexor.

12. A method for fetching instructions in an information handling system including a cache for storing addressable instructions, instruction queues for storing a set of fetched instructions, at least one branch target calculator coupled to the instruction queues and a fetch address selector, said method comprising the steps of;
   determining in parallel, in the branch target calculator, if the instructions in the instruction queues are branch instructions;
   calculating in parallel, in the branch target calculator, the target addresses of the branch instructions,
   selecting in the fetch address selector, one of the target addresses as a fetch address,
   providing the cache with said fetch address for fetching a new set of instructions;
   providing branch resolution logic operably coupled to the fetch address selector
   resolving in the branch resolution logic the branch instructions and
   providing a branch queue coupled to the branch target calculator, the instruction queues and the fetch address selector.

13. The method as recited in claim 12, wherein said determining and calculating steps are performed either before or during the time in which said resolving step is performed.

14. The method as recited in claim 12, wherein said resolving step further includes the step of predicting the outcomes of the branch instructions.

15. The method as recited in claim 14, wherein said predicting step includes the step of providing a branch history table including BHT entries.

16. The method as recited in claim 15, wherein said step of providing a branch history table further includes the step of storing said BHT entries in the instruction queues at the same time that the set of fetched instructions are stored in the instruction queues.

17. The method as recited in claim 12, further comprising the step of receiving, in the branch queue, the target addresses and the addresses of the set of fetched instructions stored in the instruction queues.

18. The method as recited in claim 17, further comprising the steps of:

saving, in the branch queue for each predicted branch outcome, the target address if the predicted branch outcome is not taken or the address of the set of fetched instructions stored in the instruction queues if the predicted branch outcome is taken; and providing, in the case of a misprediction of a branch outcome, at least one resolved branch address to the fetch address selector wherein each of said resolved branch addresses are said addresses saved in the branch queue.

19. The method as recited in claim 18, further comprising the step of providing a sequential address to the fetch address selector.

20. The method as recited in claim 19, further comprising the step of providing an interrupt address to the fetch address selector.

21. The method as recited in claim 20, further comprising the step of prioritizing, in the branch resolution logic, the target addresses, the resolved address, the sequential address and the interrupt address from a highest priority address to a lowest priority address.

22. The method as recited in claim 21 wherein said selecting step further includes the step of selecting the highest priority address as the fetch address.

* * * * *